(12) United States Patent
Bosma et al.

(10) Patent No.: US 8,113,229 B2
(45) Date of Patent: Feb. 14, 2012

(54) GEAR OPERATED SHUT VALVE FOR A VENTILATION SYSTEM

(75) Inventors: Cordell Bosma, Lewis Center, OH (US); Tadayuki Nishimura, Marysville, OH (US); Tadashi Yoda, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 834 days.

(21) Appl. No.: 12/179,381

(22) Filed: Jul. 24, 2008

(65) Prior Publication Data
US 2010/0019183 A1 Jan. 28, 2010

(51) Int. Cl.
*A01M 7/00* (2006.01)
*B60P 3/30* (2006.01)
*E01H 1/10* (2006.01)

(52) U.S. Cl. ......... 137/353; 251/248; 251/305; 454/152

(58) Field of Classification Search .......... 251/248, 251/249, 249.5, 250, 250.5, 305, 306, 307, 251/308, 228, 229, 293, 304; 454/139–156; 74/417, 421 R, 421 A, 423, 424; 137/351, 137/353
See application file for complete search history.

(56) References Cited

U.S. PATENT DOCUMENTS

| | | | |
|---|---|---|---|
| 1,231,813 A * | 7/1917 | Tobeler et al. ............... | 251/249 |
| 3,507,354 A | 4/1970 | Dieckmann et al. | |
| 3,602,127 A | 8/1971 | Walker et al. | |
| 4,656,926 A | 4/1987 | Bauer et al. | |
| 4,676,146 A | 6/1987 | Takahashi et al. | |
| 4,749,004 A * | 6/1988 | Peash ........................... | 137/865 |
| 5,338,252 A * | 8/1994 | Bowler et al. ................ | 454/155 |
| 6,036,593 A | 3/2000 | Koerber et al. | |
| 6,083,099 A | 7/2000 | Brown | |
| 6,254,175 B1 | 7/2001 | Kim | |
| 6,533,655 B2 | 3/2003 | Demerath et al. | |
| 6,652,371 B2 | 11/2003 | Kamio | |
| 6,827,141 B2 * | 12/2004 | Smith et al. ................... | 165/202 |
| 6,893,338 B2 | 5/2005 | Katagiri et al. | |
| 6,974,377 B2 | 12/2005 | Gehring et al. | |
| 7,056,203 B2 | 6/2006 | Shibata et al. | |
| 7,097,555 B2 * | 8/2006 | Bourbon ........................ | 454/152 |
| 7,229,348 B2 | 6/2007 | Shibata | |
| 2003/0220066 A1 | 11/2003 | Stevenson et al. | |

(Continued)

FOREIGN PATENT DOCUMENTS

JP 10109521 A * 4/1998
JP 2003267034 A * 9/2003

OTHER PUBLICATIONS

International Search Report and Written Opinion from related PCT Application No. PCT/US2009/50384 mailed Oct. 22, 2009.

(Continued)

*Primary Examiner* — Stephen M Hepperle
*Assistant Examiner* — Seth Faulb
(74) *Attorney, Agent, or Firm* — Plumsea Law Group, LLC; Mark E. Duell (57) ABSTRACT

A gear operated shut valve for a ventilation system in a motor vehicle is disclosed. The gear operated shut valve includes gear train. The gear train includes a driven gear that is associated with the shut valve and a driving gear that is associated with an outlet knob on an outlet of the ventilation system. The shut valve is substantially angled with respect to the outlet.

20 Claims, 6 Drawing Sheets

U.S. PATENT DOCUMENTS

| | | | |
|---|---|---|---|
| 2005/0239391 A1* | 10/2005 | Shibata | 454/155 |
| 2006/0057952 A1* | 3/2006 | Kim | 454/155 |
| 2006/0073781 A1* | 4/2006 | Mochizuki et al. | 454/152 |
| 2006/0130997 A1 | 6/2006 | Marshall | |
| 2007/0184774 A1* | 8/2007 | Balzo et al. | 454/143 |

OTHER PUBLICATIONS

International Preliminary Report on Patentability mailed Feb. 3, 2011 in International Application No. PCT/US2009/050384.

* cited by examiner

GEAR OPERATED SHUT VALVE FOR A VENTILATION SYSTEM

BACKGROUND OF THE INVENTION

1. Field of the Invention

The present invention relates to motor vehicles and in particular to a gear operated shut valve for a ventilation system.

2. Description of Related Art

Methods of stopping airflow in a ventilation system for a motor vehicle have been previously proposed. Bauer (U.S. Pat. No. 4,656,926) is directed to a ventilation control unit for motor vehicles. Bauer teaches a control unit with multiple knobs. The knobs may be used to control heating, air conditioning or ventilation systems.

Bauer teaches a plurality of rotatable control knobs that are mounted to a front panel. The control knobs are directly connected to bevel gears. The bevel gears are further connected to driven bevel gears. The gears are oriented at a ninety degree angle from one another. As the driven bevel gears rotate, adjusting levers are moved, which further move the Bowden cables. Bauer teaches that it is possible to operate a fan flap with these Bowden cables.

Demerath (U.S. Pat. No. 6,533,655) is directed to an air vent for ventilation systems. Demerath teaches an operating element that can be used to manually adjust air guiding vanes, as well as an airflow flap. The position of the airflow flap can be adjusted, and includes a position to completely block the airflow to the air vent.

Demerath teaches an operating knob disposed outside of the vent that may be rotated, which causes a rotation in a cardan shaft. As the cardan shaft is rotated, a first conical wheel gear of a bevel gear also rotates. The bevel gear is meshed with a conical gear wheel that is attached to an airflow flap. Therefore, as the bevel gear rotates, the setting angle of the airflow flap is changed. As the setting angle of the airflow flap is changed, the airflow through the vent is varied, and in some cases the airflow flap can be positioned to block the flow of air completely.

The Bauer and Demerath designs require the airflow flap or the fan flap to be disposed behind the vent. Furthermore, the Bauer design requires the use of Bowden cables in addition to gears. Demerath also requires the use of a cardan shaft. There is a need in the art for a system and method that addresses the shortcomings of the prior art listed above.

SUMMARY OF THE INVENTION

A gear operated shut valve for a ventilation system in a motor vehicle is disclosed. The invention can be used in connection with a motor vehicle. The term "motor vehicle" as used throughout the specification and claims refers to any moving vehicle that is capable of carrying one or more human occupants and is powered by any form of energy. The term motor vehicle includes, but is not limited to cars, trucks, vans, minivans, SUV's, motorcycles, scooters, boats, personal watercraft, and aircraft.

In one aspect, the invention provides a motor vehicle, comprising: a ventilation system including a duct and an outlet that is connected to an end of the duct; a shut valve that is disposed within the duct, the shut valve being substantially angled with respect to the outlet; a driving gear that is axially connected to an outlet knob of the outlet; a driven gear that is axially connected to the shut valve; and where the shut valve may be opened and closed by operating the outlet knob.

In another aspect, at least one idler gear is associated with the driving gear.

In another aspect, the outlet knob is a thumb wheel.

In another aspect, at least one idler gear is disposed between the driving gear and the driven gear.

In another aspect, the driving gear is a beveled gear.

In another aspect, the driven gear is a beveled gear.

In another aspect, at least one idler gear is a beveled gear.

In another aspect, the invention provides a motor vehicle, comprising: a ventilation system including a duct and an outlet that is connected to an end of the duct; a curved portion of the duct disposed adjacent to the outlet and a straight portion of the duct disposed adjacent to the curved portion; the outlet including an outlet knob; a shut valve associated with the straight portion; a gear train configured to connect the outlet knob to the shut valve including a driving gear associated with the outlet knob, a driven gear associated with the shut valve and an idler gear disposed between the driving gear and the driven gear; and where the driving gear and the driven gear are both disposed at angles to the idler gear.

In another aspect, the shut valve is substantially angled with respect to the outlet.

In another aspect, the gear train is disposed on an outer surface of the curved portion.

In another aspect, the driving gear is axially connected to the outlet knob.

In another aspect, the driven gear is axially connected to the shut valve.

In another aspect, the driven gear and the idler gear are disposed at an angle of approximately 120 degrees.

In another aspect, the driving gear and the idler gear are disposed at an angle of approximately 120 degrees.

In another aspect, the invention provides a motor vehicle, comprising: a ventilation system including a duct and an outlet that is connected to an end of the duct; a curved portion of the duct disposed adjacent to the outlet and a straight portion of the duct disposed adjacent to the curved portion; the outlet including an outlet knob; a shut valve associated with the straight portion; a gear train including a plurality of gears that is configured to connect an outlet knob of the outlet with the shut valve; the gear train being disposed on an outer surface of the curved portion; and where each gear of the plurality of gears is substantially parallel with an adjacent portion of the curved portion.

In another aspect, the plurality of gears includes a driving gear.

In another aspect, the plurality of gears includes a driven gear.

In another aspect, the plurality of gears includes an idler gear.

In another aspect, the driven gear and the idler gear are angled with respect to one another.

In another aspect, the driving gear and the idler gear are angled with respect to one another.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead

DETAILED DESCRIPTION

Figure 1:
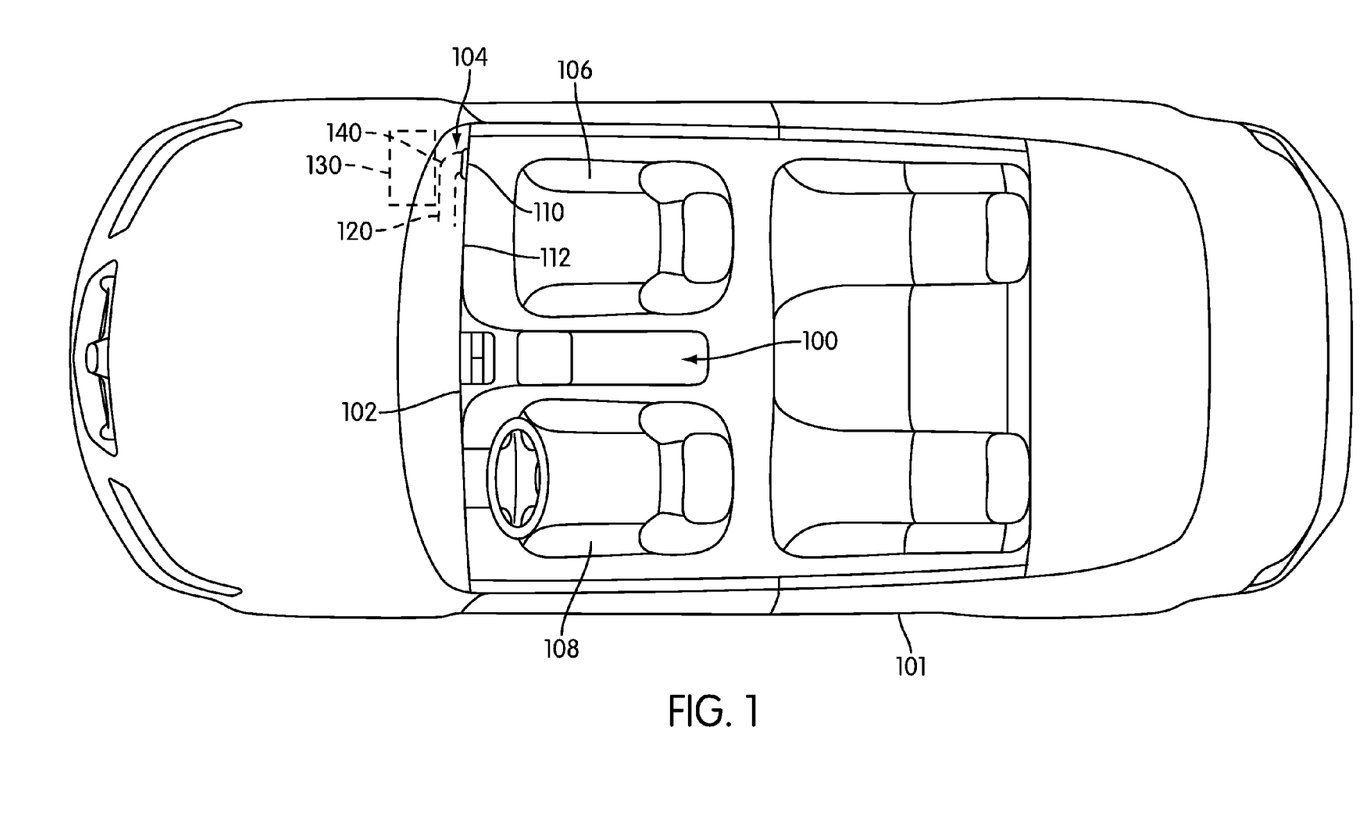
FIG. 1 is a top down schematic view of an embodiment of a motor vehicle including a vent.

FIG. 1 is a schematic top view of an embodiment of motor vehicle 101, including front interior portion 100. Generally, motor vehicle 101 could be any type of motor vehicle. Examples include, but are not limited to, sedans, coupes, compact cars, hatchbacks, trucks, or any other type of motor vehicle. In this embodiment, motor vehicle 101 is a coupe.

In some embodiments, front interior portion 100 may include dashboard 102. In some cases, dashboard 102 may be associated with one or more instruments. Examples of instruments include, but are not limited to, radios, CD players, MP3 players, DVD players, navigational systems as well as any other type of instrument. In other cases, dashboard 102 could also house other non-electrical components, such as a glove box.

A front interior portion of a motor vehicle may include provisions for ventilation. In some embodiments, a front interior portion may include one or more vents. In some cases, the vents could be disposed on the dashboard. In other cases, the vents could be disposed at other portions of the front interior portion. For example, in some embodiments vents may be disposed on doors, under seats or in a central console of the front interior portion. Additionally, vents could be associated with a rear interior portion of the motor vehicle.

In this embodiment, dashboard 102 may include vent 104. In this case, vent 104 is disposed in front of passenger seat 106. In another embodiment, vent 104 could be disposed in front of driver seat 108. Generally, vent 104 could be disposed at any portion of dashboard 102.

Vent 104 may comprise outlet 110. In some cases, outlet 110 may be recessed with respect to front surface 112 of dashboard 102. In other cases, outlet 110 may be slightly extended beyond front surface 112. In an embodiment, outlet 110 may be flush with front surface 112.

Vent 104 may further comprise duct 120 that is configured to deliver air to outlet 110. In some embodiments, duct 120 may be connected to outlet 110 at a first end. In this embodiment, only a portion of duct 120 is shown. However, it should be understood that a second end of duct 120 may be attached to a system configured to provide hot, cold, or a mixture of hot and cold air. Examples of such systems include air conditioning systems and heating systems. In an embodiment, duct 120 may be connected to a heating, air conditioning and ventilation (HVAC) system disposed within the motor vehicle.

In some embodiments, the packaging of various components behind dashboard 102 may prevent duct 120 from continuing in a straight manner behind outlet 110. For example, in the current embodiment, motor vehicle component 130 is disposed just behind outlet 110. Generally, motor vehicle component 130 could be any component that is placed behind a dashboard or under the hood of a motor vehicle. As seen in FIG. 1, the position of motor vehicle component 130 prevents the use of a straight duct.

In an embodiment, duct 120 may include curved portion 140. In some cases, curved portion 140 may be configured to turn away from motor vehicle component 130. Using this arrangement, duct 120 may be disposed between outlet 110 and motor vehicle component 130. This configuration allows for vents to be placed in regions of a motor vehicle where there is not enough clearance to use straight ducts.

In the current embodiment, curved portion 140 is configured to turn towards the left. However, it should be understood that in other embodiments, curved portion 140 could also turn towards the right. Additionally, the current embodiment only includes a single turn in curved portion 140, however, in other embodiments, curved portion 140 may include additional turns as well, including both left and right turns as well as turns in any other direction such as up or down.

Figure 2:
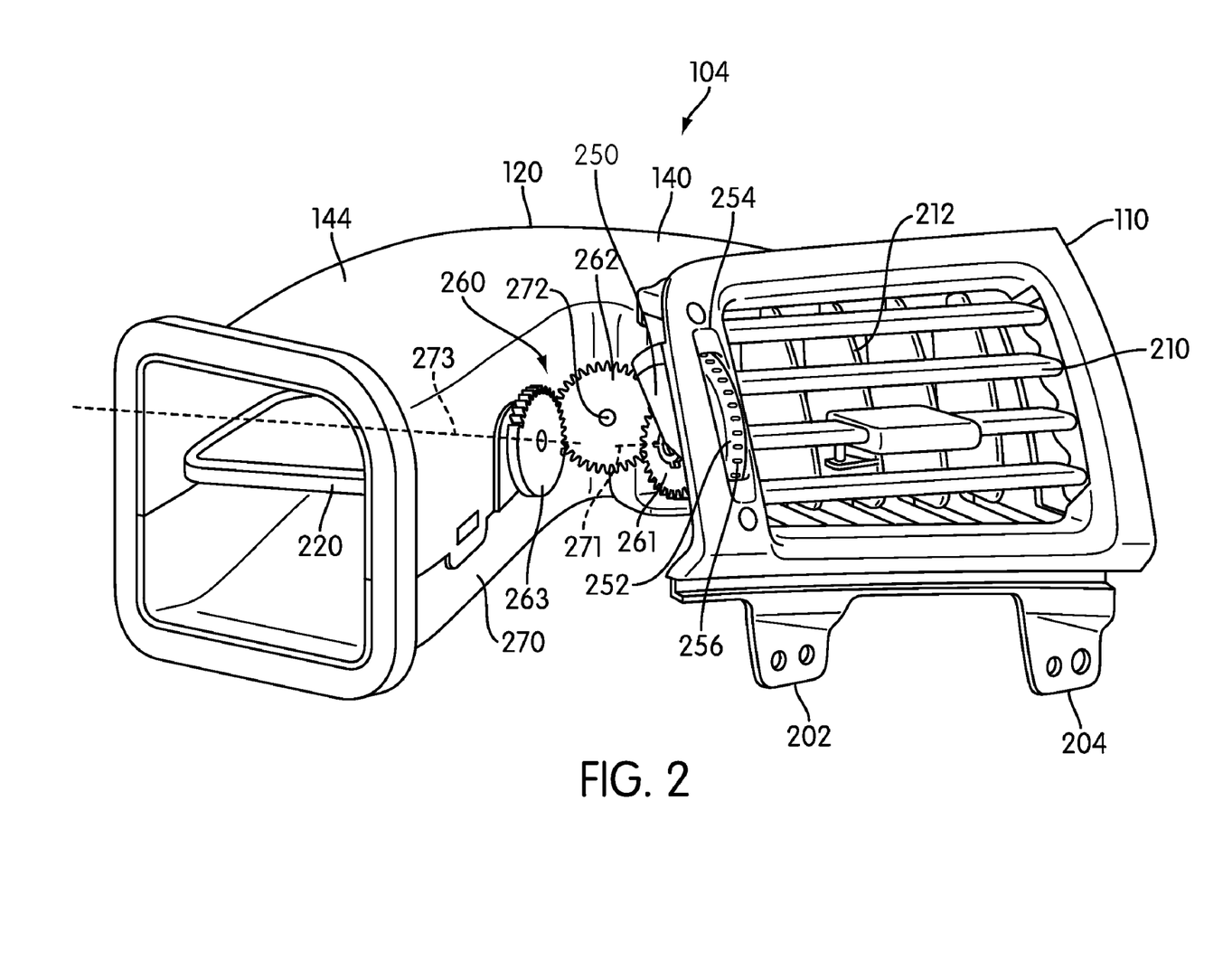
FIG. 2 is a schematic isometric view of an embodiment of a vent.

FIG. 2 is an isometric view of an embodiment of vent 104. As previously discussed, vent 104 may include outlet 110 and duct 120. In this embodiment, duct 120 further includes curved portion 140 that is disposed adjacent to outlet 110. Duct 120 may also include straight portion 144 that is disposed adjacent to curved portion 140.

In some embodiments, outlet 110 may be configured to attach to a front panel of dashboard 102, as previously discussed and shown in FIG. 1. In some cases, outlet 110 may include first mounting portion 202 and second mounting portion 204. Mounting portions 202 and 204 may be configured to receive screws that may be inserted into the front panel of dashboard 102.

In some embodiments, outlet 110 may include provisions for directing the flow of air into front interior portion 100 of motor vehicle 101. In this embodiment, outlet 110 may include horizontal fins 210 that are configured to pivot about a horizontal axis associated with each of the fins of horizontal fins 210. As horizontal fins 210 are pivoted up and down, air leaving outlet 110 may be directed upwards or downwards, depending on the orientation of horizontal fins 210. Additionally, in the current embodiment, outlet 110 may include vertical fins 212 that are configured to pivot about a vertical axis associated with each of the fins of vertical fins 212. As vertical fins 212 are pivoted up and down, air leaving outlet 110 may be directed to the left or to the right, depending on the orientation of vertical fins 212. By independently changing the orientations of fins 210 and 212, air leaving outlet 110 can be directed in any direction pointing outwards from outlet 110.

A vent may include provisions that prevent the flow of air out of an outlet. In some embodiments, a shut valve may be used to block the flow of air through a duct associated with the outlet. In some cases, the shut valve may be disposed directly behind the outlet. In other cases, where the duct includes a curved portion directly behind the outlet, it may be necessary to place the shut valve beyond the curved portion. This arrangement may be necessary because the curved portion may not provide enough clearance for the shut valve to rotate freely.

Vent 104 may include shut valve 220. In some embodiments, shut valve 220 may be disposed within duct 120. In some cases, shut valve 220 may be disposed within curved portion 140 of duct 120. In an embodiment, shut valve 220 may be disposed within straight portion 144 of duct 120. In this case, shut valve 220 is not disposed directly behind, or parallel with, outlet 110. Instead, shut valve 220 is substantially angled with respect to outlet 110, since shut valve 220 is disposed on the other side of curved portion 140 from outlet 110.

Shut valve 220 may be configured to open and close. In some embodiments, shut valve 220 may be configured to rotate. As shut valve 220 rotates through various angles, the flow of air through duct 120 may be modified. Details of the operation of shut valve 220 will be discussed later.

In some embodiments, outlet 110 may include outlet knob 250. In some cases, outlet knob 250 is a semi-circular knob. In other cases, outlet knob 250 could be a circular knob. In an embodiment, outlet knob 250 is a semi-circular thumb wheel type knob.

Outlet knob 250 may include first portion 252. First portion 252 of outlet knob 250 may extend through slot 254 of outlet 110. In some embodiments, outlet knob 250 may further include ridges 256 that are configured to increase traction between first portion 252 and a finger. This arrangement allows a driver or passenger to turn outlet knob 250 by rotating first portion 252.

Typically, a shut valve may be operated using an outlet knob disposed on an outlet of a vent. In situations where the shut valve is disposed behind the outlet, the outlet knob may be connected to the shut valve using a link connector. However, in situations where the shut valve is not disposed behind the outlet, as occurs in the current embodiment, another method of connecting the outlet knob to the shut valve must be used. A vent may include provisions for operating the shut valve in situations where the shut valve is disposed at an angle to the outlet.

In some embodiments, the outlet knob and the shut valve may be connected by a gear train. In some cases, the gear train may include a driving gear that is associated with the outlet knob. In other cases, the gear train may include a driven gear that is associated with the shut valve. In still other cases, the gear train may include one or more idler gears that are disposed between the driving gear and the driven gear. In an embodiment, the gear train may include a driving gear, a driven gear and at least one idler gear. Using gears may allow for increased mechanical advantage over other types of drive mechanisms, especially in cases where gears of different sizes are used. This allows varying rotational speeds as well as varying torques throughout the gear train and for components associated with the gears.

Figure 3:
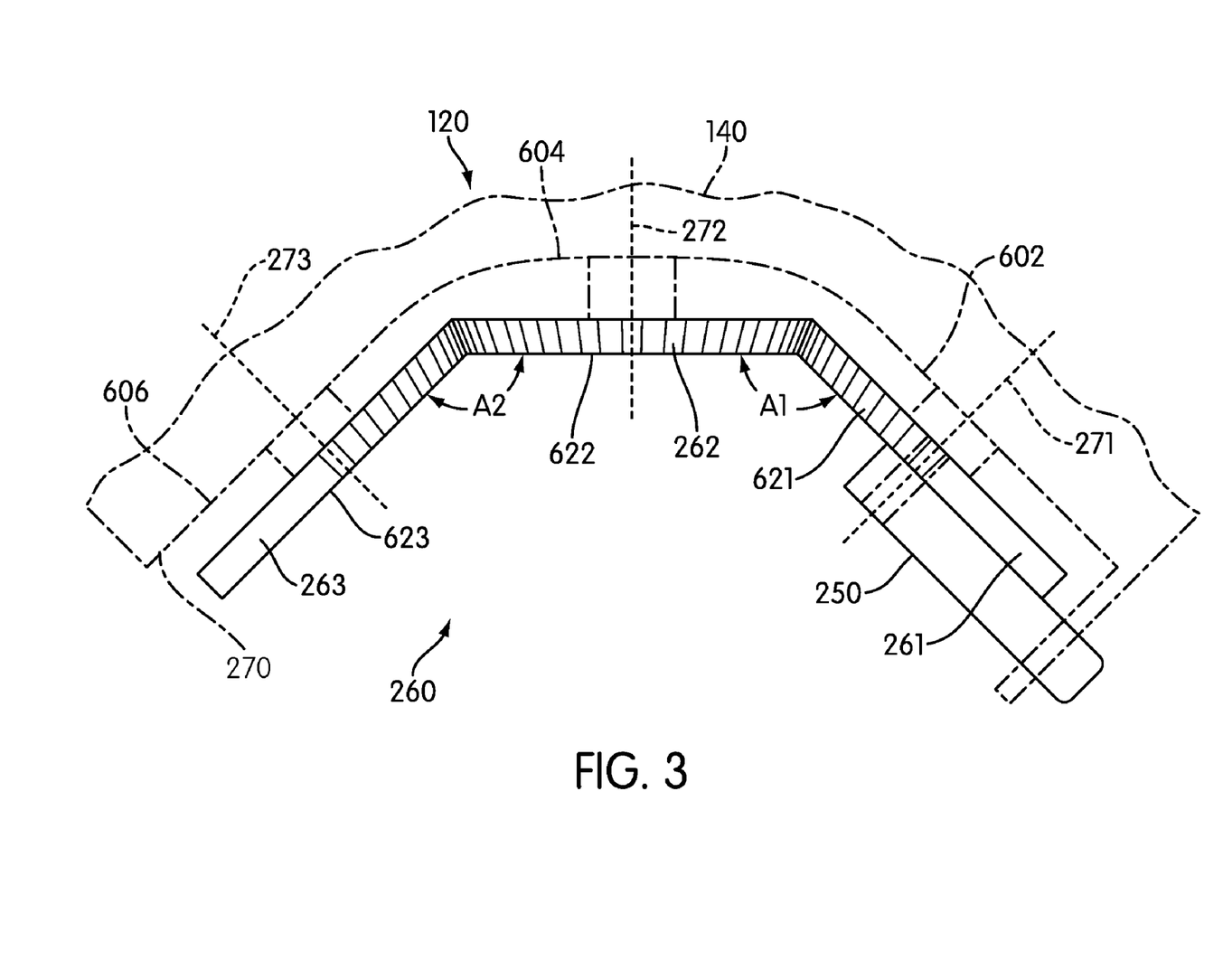
FIG. 3 is a top down schematic view of an embodiment of a gear train.

Referring to FIGS. 2 and 3, outlet knob 250 and shut valve 220 may be associated with gear train 260. In some embodiments, gear train 260 may be disposed on outer surface 270 of duct 120. In other embodiments, gear train 260 could be disposed on an inner surface of duct 120.

In some embodiments, gear train 260 may include driving gear 261. Driving gear 261 may be associated with outlet knob 250. In some cases, driving gear 261 may be directly attached to outlet knob 250. In an embodiment, driving gear 261 may be axially connected to outlet knob 250 along driving gear axis 271. With this arrangement, driving gear 261 may be configured to rotate with outlet knob 250.

In some embodiments, gear train 260 may include driven gear 263. Driven gear 263 may be associated with shut valve 220. In some cases, driven gear 263 may be directly attached to shut valve 220. In an embodiment, driven gear 263 may be axially connected to shut valve 220 along driven gear axis 273. With this arrangement, driven gear 263 may be configured to rotate with shut valve 220. In other words, shut valve 220 may be rotated by turning driven gear 263.

In some embodiments, gear train 260 may also include idler gear 262. Idler gear 262 may be disposed between driving gear 261 and driven gear 263. Generally, idler gear 262 is configured to rotate about idler gear axis 272. Using this arrangement, idler gear 262 may be configured to transfer rotational motion between driving gear 261 and driven gear 263.

As seen in FIG. 3, gear train 260 is configured to turn with curved portion 140 of duct 120. In this embodiment, driving gear 261 may be substantially parallel to first portion 602 of curved portion 140. Additionally, idler gear 262 may be substantially parallel to second portion 604 of curved portion 140. In a similar manner, driven gear 263 may be substantially parallel to third portion 606 of curved portion 140.

Generally, gears 261-263 may be any type of gears. Examples of types of gears include, but are not limited to, spur gears, helical gears, double helical gears, bevel gears and crown gears as well as other types of gears. In some embodiments, each of the gears 261-263 may be a different type of gear as long as the teeth associated with each gear are configured to mesh together. Additionally, in the embodiments discussed in this detailed description, the entire circumference of a gear may include teeth, or only a portion of the circumference of the gear may include teeth.

In some embodiments, gears 261-263 may be of equal size. In other embodiments, the size of each of the gears 261-263 may be different. As previously mentioned, using different sized gears allows for a mechanical advantage over other types of drive mechanisms.

In this embodiment, gears 261-263 are all beveled gears. This beveled arrangement allows the teeth of adjacent gears to mesh together when gears 261-263 are disposed at angles to one another, as occurs in the current embodiment. In this embodiment, first surface 621 of driving gear 261 makes an angle A1 with second surface 622 of idler gear 262. Likewise, second surface 622 of idler gear 262 makes an angle A2 with third surface 623 of driven gear 263. Angles A1 and A2 may be any angles between 0 and 180 degrees. In an embodiment, angles A1 and A2 are approximately equal, with values of about 120 degrees.

Figure 4:
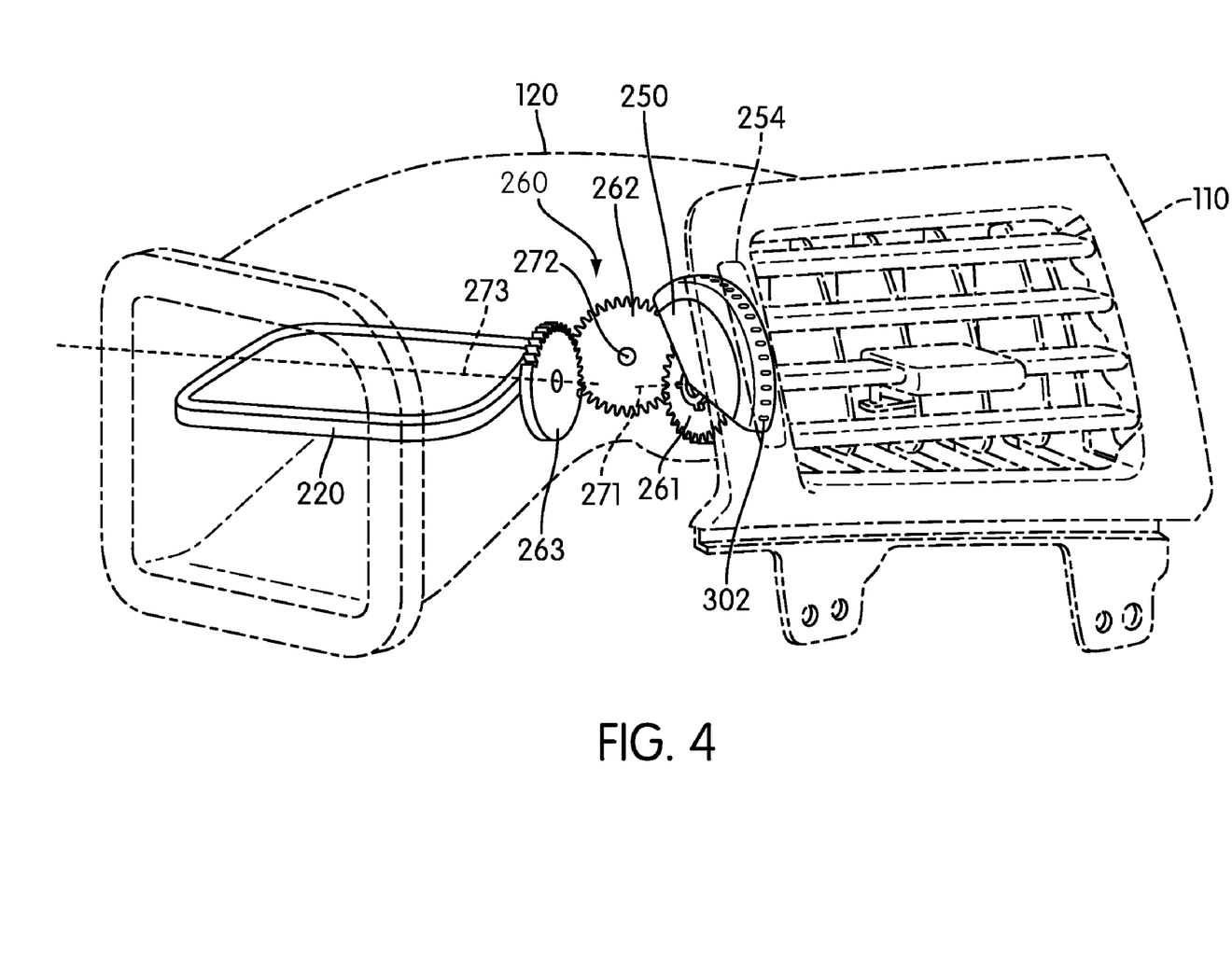
FIG. 4 is a schematic isometric view of an embodiment of a vent in an open position.
Figure 5:
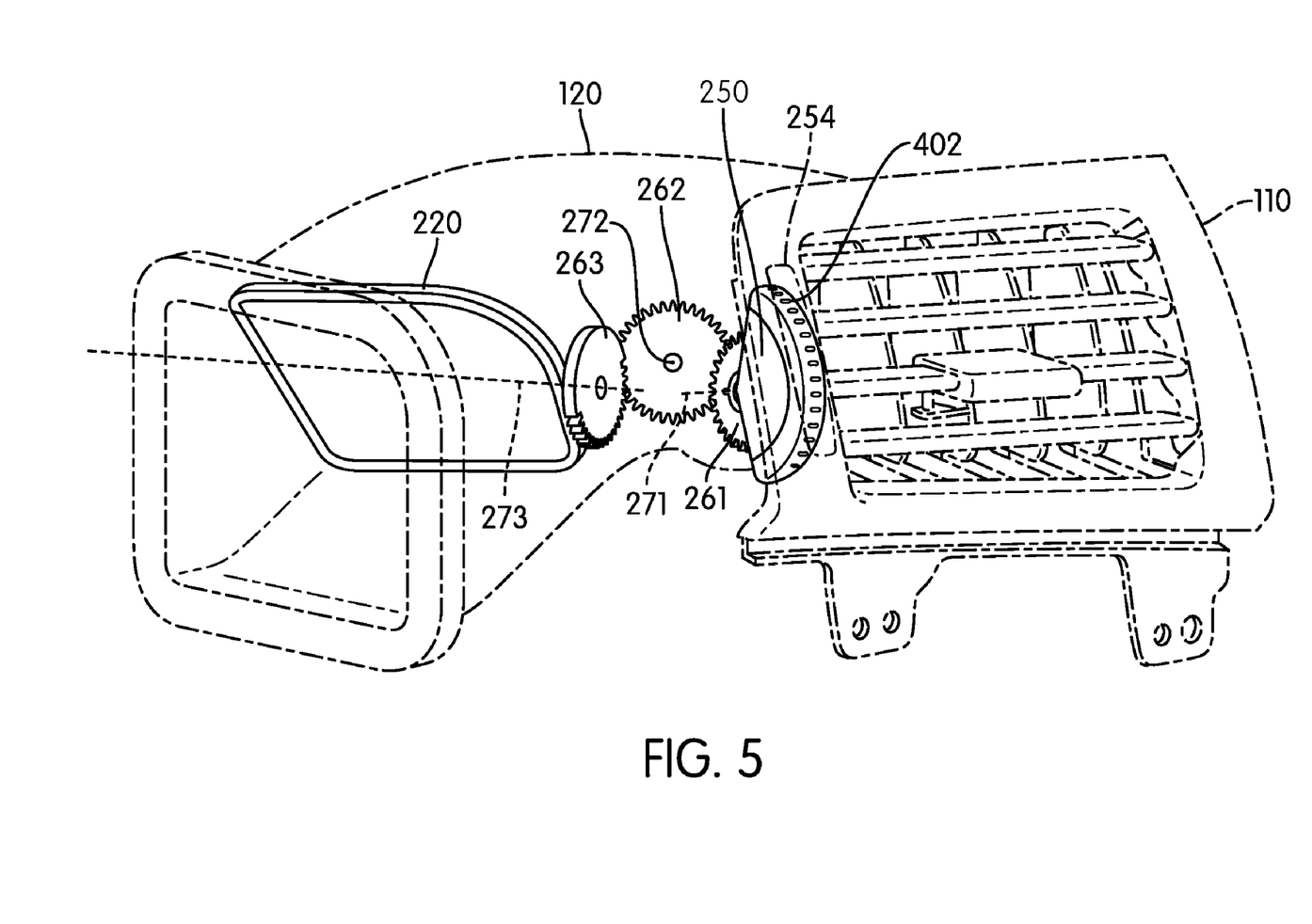
FIG. 5 is a schematic isometric view of an embodiment of a vent in a closed position.
Figure 6:
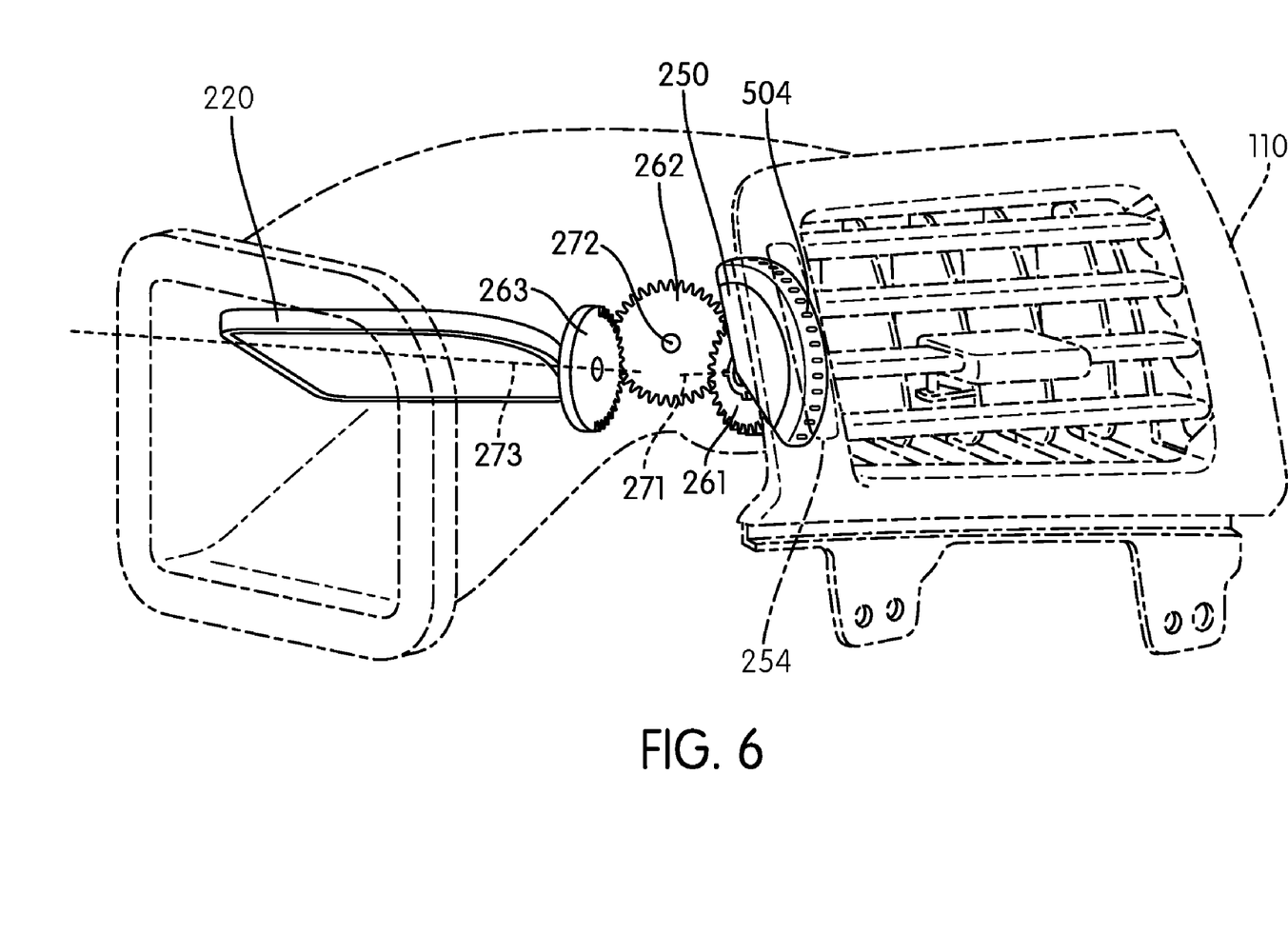
FIG. 6 is a schematic isometric view of an embodiment of a vent in an intermediate position.

FIGS. 4-6 are intended to illustrate how shut valve 220 may be opened and closed using outlet knob 250. For purposes of clarity, outlet 110 and duct 120 are shown in phantom. Furthermore, the following detailed description discusses the rotation of various gears in a clockwise and counter clockwise manner. It should be understood that the motions of the gears are described with respect to the associated axis of the gear. In particular, the rotation of driving gear 261 and of outlet knob 250 are described with respect to driving gear axis 271. Likewise, the rotation of gears 262 and 263 are described with respect to gear axes 272 and 273, respectively.

Generally, the motion of shut valve 220 is directly controlled by the motion of outlet knob 250 that is translated to shut valve 220 through gear train 260. As outlet knob 250 is rotated in a counterclockwise manner, driving gear 261 is also rotated in a counterclockwise manner. The motion of driving gear 261 in the counterclockwise direction forces idler gear 262 to rotate in a clockwise manner. As idler gear 262 rotates in a clockwise manner, driven gear 263 is forced to rotate in a counterclockwise manner.

This motion may be reversed when outlet knob 250 is rotated in a clockwise manner. In particular, as outlet knob 250 is rotated in a clockwise manner, driving gear 261 is also rotated in a clockwise manner. The motion of driving gear 261 in the clockwise direction forces idler gear 262 to rotate in a counterclockwise manner. As idler gear 262 rotates in a counterclockwise manner, driven gear 263 is forced to rotate in a clockwise manner.

In the current embodiment, it is clear that driven gear 263 rotates in a manner similar to outlet knob 250. In other embodiments that include a different number of idler gears, this relationship could be reversed. In other words, in some embodiments, driven gear 263 could be configured to rotate in a manner opposite of outlet knob 250. These alternative configurations for a gear train could still be used to operate a shut valve using an outlet knob, as the same basic principles, discussed with respect to the current embodiment, still apply in embodiments using a different number of gears.

Outlet 110 may include provisions to prevent outlet knob 250 from rotating through a full 360 degrees. These provisions could include mechanical stops that prevent outlet knob 250 from completing a full rotation. In some embodiments, outlet knob 250 may be configured to rotate 180 degrees. In an embodiment, outlet knob 250 may be configured to rotate less than 180 degrees.

Referring to FIG. 4, shut valve 220 may be opened by rotating outlet knob 250 in a clockwise direction until first end 302 of outlet knob 250 is fully exposed through slot 254. As previously mentioned, outlet knob 250 may be prevented from rotating further in the clockwise direction by using mechanical stops. In an embodiment, when outlet knob 250 is maximally rotated in the clockwise direction, shut valve 220 is configured in an open position. This orientation of shut valve 220 generally allows for maximum airflow through duct 120 to outlet 110.

Referring to FIG. 5, shut valve 220 may be substantially closed by rotating outlet knob 250 in a counterclockwise direction until second end 402 of outlet knob 250 is fully exposed through slot 254. As previously mentioned, outlet knob 250 may be prevented from rotating further in the counterclockwise direction by using mechanical stops. In an embodiment, when outlet knob 250 is maximally rotated in the counterclockwise direction, shut valve 220 is configured in a closed position. This orientation of shut valve 220 generally prevents air from flowing through duct 120 to outlet 110.

Referring to FIG. 6, shut valve 220 can be rotated to any intermediate position between the open and closed positions as well. In this embodiment, shut valve 220 is oriented in an intermediate position. In this case, outlet knob 250 may be oriented so that middle portion 504 is exposed through slot 254 of outlet 110. The term "intermediate position", as used through this detailed description and in the claims, refers to any position of a shut valve between the fully open and the fully closed positions. By adjusting outlet knob 250 between a maximal clockwise rotation and a maximal counterclockwise rotation, shut valve 220 can be oriented in various intermediate positions. This arrangement allows a driver or passenger to control the volume of air that passes from outlet 110, in addition to the direction.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A motor vehicle, comprising:
   a ventilation system including a duct and an outlet that is connected to an end of the duct;
   a shut valve that is disposed within the duct, the shut valve being substantially angled with respect to the outlet;
   a driving gear that is axially connected to an outlet knob of the outlet, wherein the driving gear rotates around a driving gear axis;
   a driven gear that is axially connected to the shut valve, wherein the driven gear and the shut valve rotate around a driven gear axis;
   wherein the driving gear axis intersects the driven gear axis when viewed from a top down view, such that the shut valve is angled with respect to the driving gear; and
   wherein the shut valve may be opened and closed by operating the outlet knob.

2. The motor vehicle according to claim 1, wherein at least one idler gear is associated with the driving gear.

3. The motor vehicle according to claim 1, wherein the outlet knob is a thumb wheel.

4. The motor vehicle according to claim 2, wherein at least one idler gear is disposed between the driving gear and the driven gear.

5. The motor vehicle according to claim 1, wherein the driving gear is a beveled gear.

6. The motor vehicle according to claim 1, wherein the driven gear is a beveled gear.

7. The motor vehicle according to claim 2, wherein the at least one idler gear is a beveled gear.

8. A motor vehicle, comprising:
   a ventilation system including a duct and an outlet that is connected to an end of the duct;
   a curved portion of the duct disposed adjacent to the outlet and a straight portion of the duct disposed adjacent to the curved portion;
   the outlet including an outlet knob;
   a shut valve associated with the straight portion;
   a gear train configured to connect the outlet knob to the shut valve including a driving gear associated with the outlet knob, a driven gear associated with the shut valve and an idler gear disposed between the driving gear and the driven gear; and
   wherein the driving gear rotates around a driving gear axis, the driven gear rotates around a driven gear axis, and the idler gear rotates around an idler gear axis; and
   wherein the driving gear axis and the driven gear axis each intersect the idler gear axis when viewed from a top down view, such that the driving gear and the driven gear are both disposed at angles to the idler gear.

9. The motor vehicle according to claim 8, wherein the shut valve is substantially angled with respect to the outlet.

10. The motor vehicle according to claim 8, wherein the gear train is disposed on an outer surface of the curved portion.

11. The motor vehicle according to claim 8, wherein the driving gear is axially connected to the outlet knob.

12. The motor vehicle according to claim 8, wherein the driven gear is axially connected to the shut valve.

13. The motor vehicle according to claim 8, wherein the driven gear and the idler gear are disposed at an angle of approximately 120 degrees.

14. The motor vehicle according to claim 8, wherein the driving gear and the idler gear are disposed at an angle of approximately 120 degrees.

15. A motor vehicle, comprising:
   a ventilation system including a duct and an outlet that is connected to an end of the duct;
   a curved portion of the duct disposed adjacent to the outlet and a straight portion of the duct disposed adjacent to the curved portion;
   the outlet including an outlet knob;
   a shut valve associated with the straight portion;
   a gear train including a plurality of gears that is configured to connect the outlet knob of the outlet with the shut valve;

wherein the plurality of gears includes
  a driving gear that is associated with the outlet knob and rotates around a driving gear axis, and
  a driven gear that is associated with the shut valve and rotates around a driven gear axis;
the gear train being disposed on an outer surface of the curved portion;
wherein the driving gear axis intersects the driven gear axis when viewed from a top down view; and
wherein each gear of the plurality of gears is substantially parallel with an adjacent portion of the curved portion.

16. The motor vehicle according to claim 15, wherein the plurality of gears includes an idler gear that rotates around an idler gear axis.

17. The motor vehicle according to claim 16, wherein the driven gear axis and the idler gear axis intersect such that the driven gear and the idler gear are angled with respect to one another.

18. The motor vehicle according to claim 16, wherein the driving gear axis and the idler gear axis intersect such that the driving gear and the idler gear are angled with respect to one another.

19. The motor vehicle according to claim 17, wherein the driven gear axis intersects the idler gear axis such that the driven gear and the idler gear are disposed at an angle of approximately 120 degrees.

20. The motor vehicle according to claim 18, wherein the driving gear axis intersects the idler gear axis such that the driving gear and the idler gear are disposed at an angle of approximately 120 degrees.

* * * * *